Patented June 22, 1937

2,084,314

UNITED STATES PATENT OFFICE 2,084,314

UREA RESINS

Howard L. Bender and Harry A. Hoffman, Bloomfield, N. J., assignors to Bakelite Corporation, New York, N. Y., a corporation of Delaware No Drawing. Application November 7, 1933,
Serial No. 696,986

11 Claims. (Cl. 260—3)

This invention relates to the preparation of urea resins and to molding compositions or varnish solutions made from them.

When urea and formaldehyde, the ingredients ordinarily used in the preparation of a urea type of resin, are reacted with or without the addition of a catalyst a syrupy mass can be obtained which quickly transforms into a hard insoluble and infusible product. When a catalyst of the basic type is used, the proportions of the urea and formaldehyde can be kept within the limits of 2 mols of less of formaldehyde to each mol. of urea; but the initial reaction product so obtained tends to crystallize with considerable rapidity, and if made with alkalies like caustic soda it may darken in color under heat treatment. It has therefore been the practice to cause resinification of the mass by the addition of acids or salts that create an acid condition in the mass. Such an acidified product can be cast by pouring into molds and hardened by heating at temperatures ranging from 60 to 100° C.

Urea resins so made have been suggested for the preparation of molding compositions of both the molding powder and the laminated sheet types. By a molding composition is meant a solid composition made up of a filler, such as wood flour or paper, and a resinous binder which has sufficient viscosity so that it can be subjected to the action of heat and pressure in a mold or between plates without materially exuding therefrom, and which on the other hand possesses sufficient flow at the temperature used so that the composition will uniformly fill all parts of the mold and give a continuous resin surface to the molded piece. It is this characteristic of restricted flow under molding conditions that for practical commercial purposes is essential to molding compositions. Flow is generally determined by a so-called cup test in which a cup mold of prescribed dimensions is charged with the molding composition and the composition is forced up the sides of the cup mold by the pressure of the plunger with the aid of heat; in this operation the composition should completely fill the cup mold, and the time required for the composition to be uniformly distributed is a measure of the flow of the composition. Different rates of flow are desirable for different molding operations; but in any case it is essential that the resin binder does not set up or harden under the action of heat so as to interfere with the flow prior to the uniform distribution of the composition throughout the mold, for otherwise the molded piece will be lacking in continuity of resin surface finish.

Urea resin compositions as heretofore prepared, however, have not been found generally satisfactory for molding in actual practice. For one thing they differ from other resinous molding compositions, such as the phenolic resin compositions, in their extreme heat sensitivity as shown by their tendency to decompose when heated at or above 140° C.

Furthermore, if the temperature at which a urea resin composition is molded is slightly below the optimum temperature for that particular composition, the composition is insufficiently hardened or undercured, and upon release from the mold the molded piece tends to develop blisters or other defects; while if the temperature to which the composition is subjected is somewhat above the optimum temperature the molded piece is overcured and again tends to show blisters upon release. As small a change as 4 degrees centigrade above or below the proper temperature is enough to exhibit overcuring or undercuring of a urea resin composition as hitherto supplied.

Then again the time range to which such a composition can be subjected in the molding operation is so extremely limited that thick sections will be undercured if properly molded for the thin portions, and thin sections will be overcured and rendered opaque or blistered if properly molded for the thick portions. With a molded piece of a uniform thickness throughout it may be possible to so control the temperature and pressure conditions as to yield a properly cured molded article from compounds that are sharply sensitive to over and undercuring. But since in most cases molded pieces are of varying sections, being thin in some parts and thick in other parts, a longer application of heat and pressure is necessary for a thick section than that required for a thin section in order that all parts be properly cured; and the design of the steel molds themselves that are used in the operation introduces irregularities and obstacles to the uniform transmission of heat to the molding material, thus further lessening the possibilities of proper curing within the restricted time range available.

A further practical requirement with regard to molding compositions is that they should be relatively dense so that a mold can be charged with the material dense enough in itself so as not to undergo a too great reduction in volume during the molding operation. A fibrous filler, such as wood pulp, cotton flock for instance, yields a very fluffy or loose composition unless sufficiently compacted by the application of pressure. In factory practice, a compact condition of the molding material is best obtained by submitting a mixture of filler and resin to a hot-rolling operation; in addition it results in a thorough impregnation or mixture of the fibers. But urea resin compositions as above described are not practically suited for a hot-rolling operation, since the extreme sensitivity of the resin to the action of heat causes a setting up or hardening of the resin such that it rapidly becomes less moldable for practical purposes. Accordingly hot rolling, as preferred for phenoplastics, has been avoided in practice for urea resin compositions.

The foregoing are some of the difficulties associated with urea resin compositions which have heretofore greatly restricted their utilization in the molding field.

According to the present invention urea resin compositions are obtainable which are markedly unlike prior compositions especially in heat sensitivity in that mixtures of fibrous filler with the resins can be subjected to hot-rolling, and they are furthermore characterized by a time and temperature range in which they are less liable to suffer from undercuring or overcuring such that articles of widely varying thickness can be molded therefrom. Furthermore, the resins themselves are characterized by absence of color and by light-proofness and thereby permit the molding of articles of white or pastel shades. In addition the resins are obtainable in a transparent anhydrous form and even when mixed with as high as equal proportions by weight of cellulose pulp yield translucent molded articles. A further surprising property of articles molded therefrom is an improved resistance to the action of moisture as compared with urea resin compositions heretofore available.

These fundamental and far-reaching changes in urea resin compositions are accomplished by relatively simple changes in the resin reaction but which have considerable practical value. Preferably, though not necessarily, the final part of the resin reaction is carried on under water-free conditions, that is, urea, is reacted with solid paraform; a water solution of formaldehyde or its polymers, however, can be used and the water preferably eliminated by evaporation or otherwise after the initiation and before the completion of the resin formation.

The invention has for its basis the discovery that certain types of basic catalysts can direct the reaction of urea or equivalent substance such as thiourea, with aldehydes into forming light colored, free flowing, water-resistant resins that can be hot-rolled and thereafter molded into articles that remain substantially stable in color under heat and exposure to heat. In general catalysts which are more basic than urea but not sufficiently basic as to cause decomposition or resinification of the aldehyde used are suitable. It is well known that sodium hydroxide causes the decomposition of formaldehyde to sodium formate and methyl alcohol as in the so-called "Cannizzaro" reaction, and calcium hydroxide causes formaldehyde to change rapidly to formose, a type of water-soluble sugar. Such decomposition products of aldehyde interfere considerably and seem to have a very adverse effect on urea-formaldehyde reaction products for technical purposes in rendering them sensitive to water and causing so-called hydrophilic tendencies.

In this reaction the formaldehyde may be replaced in whole or in part by those aldehydes or ketones which either resinify or decompose in the presence of strong alkalies for instance paraldehyde, benzaldehyde, acetone, etc. and may be replaced in part by alcohols which are unstable in presence of alkalies for instance benzyl alcohol, hydroxy benzyl alcohol, etc. The urea or thiourea or their mixtures may be replaced by monosubstituted ureas and may be replaced in part by any amid which will react with aldehydes for instance acetamid, paratoluene sulfonamid, etc.

The preferred catalysts of this invention are nitrogen-bearing organic or inorganic compounds more basic than urea or thiourea itself but unite in molar quantities with formaldehyde or its equivalent; the molaraldehyde complex is probably the effective catalyst, and this ability to form reaction products with definite amounts of aldehyde, may explain why these basic compounds do not catalyze the decomposition of formaldehyde per se. Only those reaction products with aldehydes, however, in which when calculated for a monohydroxy base at least two mols of a basic compound unite with three or less mols of an aldehyde (and the products either added as such or produced in situ) have been found to promote the desired resin formation as herein described. Basic compounds found suitable for this purpose comprise: hydroxylated substituted amines of which triethanolamine is a typical example; mono-substituted amines, such as methyl amine, amyl amine, hydroxylamine, etc.; mono-substituted diamines, exemplified by ethylene diamine, propylene diamine, etc.; and, when color is not important, the aromatic amines such as represented by aniline, phenylene diamine, etc. The aldehyde-ammonias or substituted ammonias made by reacting ammonia with a higher aldehyde as benzaldehyde make suitable catalysts, but hexamethylenetetramine obtained from the reaction of six formaldehyde and four ammonia molecules is so mildly catalytic, that about ten times as much is needed for the purposes of this invention as of the compound made with ethylenediamine; since hexamethylenetetramine is water-soluble, too much of it in the resin affects the water resistance or desirable hydrophobic properties of the whole mass.

Actual conditions of acidity with catalytically active acids are to be avoided; certain weak acids, however, are catalytically inactive for urea resins, for instance carbonic, stearic and carbolic acids; and salts of the catalysts with such acids, for instance methyl amine carbonate, may be used for the catalytic reactions, since the chemical activity of the aldehyde in this reaction displaces these weak relatively inert acids to form the desired catalytic material in situ. It follows therefrom that the measurement of pH concentration of the mass has no direct bearing on the catalytic speed, and the basic catalysts as here mentioned are active for resinification either in the presence or absence of such weak acids.

When a mixture, in the proportion of 2 mols of paraform or aqueous formaldehyde to 1 mol. of urea with a catalyst as here described is allowed to react in the cold, a product is generated which in a few hours separates from the water that is present or that is formed in the reaction; in other words the resulting product precipitates because it is relatively insoluble in water, and being water-insoluble undesirable water soluble by-products may be removed by washing with water. This hydrophobic quality is a desirable characteristic in so far as the preparation of molding compositions is concerned. The reaction, however, can be accelerated without material detriment to the ultimate water-insoluble property by heating the mixture from 10 to 20 minutes at 100 to 110° C.; at the end of this interval the desired condensation to the resin state has taken place, though the hot mixture still has the appearance of a clear solution. When paraform is used as one of the ingredients the reaction mass at this point is liquid when hot but solid when cold.

In the foregoing typical reaction the amount of catalyst included is about 5 grams to each gram-molecule of urea. This proportion appears to give about the best operating conditions, though satisfactory results are obtained with amounts as low as 1 gram to each gram-molecule of urea, and on the other hand substantially greater amounts than 5 grams are not prohibited by reaction conditions. Likewise the proportion of paraform or farmaldehyde can be varied from about 1.5 mols to 2.5 mols to each mol. of urea without detrimental effect in the final product. When more than 1.5 mols of formaldehyde are used, further amounts of urea can be added after the hydrophobic product has been formed.

A catalyst of the character above defined enables a resinifying action to proceed without gelation, or loss of plastic flow. Gelation may be defined as referring to a sudden loss of the liquid state of the mass as a whole though it contains both solid and liquid constituents, while resinification is a change in properties of the mass to those characterizing a resin such as appearance, fracture, etc. After the resinification reaction is partly completed, the catalyst may be removed or rendered inert in order to enable a controlled degree of gelation to occur in the neutral resin mass. An acid condition, however, is to be avoided for even a short time exposure to catalytically active acids will cause a considerable loss of plastic flow and thus render the material unsuited for working on hot rolls. The alkaline catalyst can best be removed by washing or rendered inert by forming addition products of the catalyst with many neutral salts and organic compounds, for instance, ethylene chlorhydrin, ethyl oxalate, mercuric chloride, barium chloride, or with acids where the salt of the acid is or forms a practically neutral compound under the reaction conditions.

The alkaline or the neutralized reaction mass is then mixed with cotton flock, alpha pulp, paper pulp or other fibrous filler and is thereupon subjected to thorough mixing through the action of hot rolls. In the hot-rolling operation at temperatures slightly above the boiling point of water some of the water or other volatile content is driven off, and a compact uniform molding composition is obtained. In case the initial alkaline catalysts are to be used throughout without change or removal, it is desirable to use approximately half the above amount of catalyst and to roll at somewhat lower temperatures, such as around 70° to 90° C., to obtain controlled changes in the rolling operation. In cases where a less dense compound is desirable, for instance where rolled paper is after-impregnated and then cut into small pieces, the hot rolling operation may be replaced by a heat-treatment as in an oven or dehydrator and the treatment stopped when the desired flow range is reached, by cooling to room temperature.

The composition thus obtained is ready for molding. Contrary to other urea resin compositions it can be molded at temperatures varying from 140 and up to 160° C. or more and pressures of 200 pounds per square inch or more, in accordance with customary molding practice without decomposition of the resin. Furthermore it has a molding time range of about 5 minutes at 160° C. without resulting in undercuring or overcuring, so that articles of widely varying thickness, for instance with factors of from 1 to 10, can be molded without blistering or other defects.

In order that the invention may be clearly presented specific examples are hereto appended; it is to be understood that the invention is not limited to the specific ingredients or proportions set forth.

*Example 1.*—60 parts of urea and 60 parts of paraform are mixed with 3 parts of ethylene diamine; the mixture is reacted in an open vessel for 20 minutes at 100° C. 1 to 6 parts of ethylene chlorhydrin are then added according to the hardening speed desired in the operation, the mass is then cooled. It is mixed with approximately 46 parts cotton flock or other filler in a kneader, then rolled on heated rolls to a flow characteristic determined by the type of mold to be used. In this operation the water present is driven off, and the resin is fused and forced into the fibers giving a homogeneous and relatively dense molding composition. The rolled masses are cooled to check the reaction and ground into small pieces. The composition so obtained is suitable for molding under heat and pressure. For instance, the composition described was charged into a mold and submitted to the temperature of about 154° C. and a pressure of about 1000 pounds per square inch for a period of 2 minutes (or more if desirable), and the molded article was then discharged hot from the mold. The article was translucent with good surface appearance and free from any blistering.

*Example 2.*—30 parts of urea, 30 parts of thiourea, 150 parts of aqueous formaldehyde (37.5%) and 3 parts of 26% methyl amine solution in water are reacted together by boiling under a reflux for about 10 minutes. The mass is dehydrated under 20 inches of vacuum until the boiling temperature in the mass reaches 100° C. The resin is incorporated in a molding composition as in the preceding example.

*Example 2.*—30 parts of urea, 38 parts of thioformaldehyde is often acidic, it is desirable to have present an excess of a neutralizing but catalytically inert base in conjunction with the desired catalyst. For instance in the preceding Example 2, 2 parts of calcium carbonate and 2 parts of amyl amine form a suitable catalytic material. Thus any formic acid in the formaldehyde, either present or formed by oxidation during the process, is rendered inert by the stronger alkaline material. The resin is made and incorporated into molding compositions as before.

*Example 4.*—60 parts urea, 160 parts of 37.5% formaldehyde solution and 2.6 parts of methyl amine in water saturated with carbon dioxide are mixed at room temperature and cooled to 0° C. A solid precipitate slowly forms and after a few hours can be filtered off from the water layer. After twenty-four hours at 0° C. the above mixture is free from odor of formaldehyde. The solid is separated by filtration and then mixed with 44 parts cotton floc. The mechanical mixture of the binder and cotton filler can be molded at low pressure when very free flowing characteristics are desired. But for ordinary molding conditions this mixture is improved by kneading or rolling at 70° C. or higher temperatures to a condition of less flow. The heat treated mixture can be molded under pressure of 1000 pounds or more per square inch and then removed hot from the molds in a less molding time than is required for the mechanically mixed but unheated molding powder.

With reference to the molded articles obtained in accordance with the present invention a surprising property is the greatly improved resistance to water. An outstanding weakness of urea resin compositions as heretofore supplied to the industry has been the lack of water-resistance; for instance articles molded from such compositions having about 65 per cent resin content have shown on the average from 6 to 10 per cent water absorption when submerged for four days, i. e., they have absorbed water to the extent of increasing their weight of from 6 to 10 per cent. In contrast articles molded from compositions having a 65 per cent resin content and made in accordance with this invention show an absorption only of about 1 to 2 per cent over the same period; and in this respect they compare favorably with molded phenol resin compositions. This property is of considerable practical importance, for the useful life of the molded articles made from aminoplastic is largely dependent upon extent to which water may be absorbed with consequent swelling and cracking resulting therefrom.

The resins herein described can be modified into varnishes for impregnating or coating purposes. For their preparation the resin is brought into solution by means of suitable solvents; for example such a solvent is one made of equal parts of water and methyl alcohol, but other solvents can be used, as ethyl lactate, cellosolve, benzyl alcohol, hexalin, etc. alone or in admixture with methyl alcohol or other solvent. A varnish so made having for instance about 35 per cent resin content is satisfactory for many purposes. However, on account of the highly penetrative character of the solution a more concentrated solution can be made to the extent of having a resin content of from 80 to 90 per cent; such a concentrated solution when applied by a roller to paper such as kraft paper still penetrates the sheet.

The impregnated or coated paper sheets can be stacked and subjected to the action of heat and pressure to form laminated stock. In making laminated stock the customary pressures varying from 500 to 2000 pounds per square inch and temperatures varying as much as 120 to 160° C. can be used; as the resin sets up with greater rapidity then the phenolic type the time period is relatively shorter, a period of 10 minutes at 150° C. and pressure of 1000 pounds per square inch being sufficient for a 0.1 inch pile of compressed sheets impregnated to a 35 per cent resin content. The laminated materials obtained show a good surface appearance, and when a clear white paper is used can be had in various shades of white and light colors since the resin itself is substantially free from color and may be colored with suitable dyes or pigments to any desired shade.

We claim:

1. Process of preparing a urea resin composition which comprises reacting substantially equal parts by weight of urea and an aldehyde in anhydrous form in the presence of ethylene diamine, incorporating ethylene chlorhydrin in amount sufficient to neutralize the basicity of the mass, mixing a filler therewith, and subjecting the mixture to the action of hot rolls whereby water is driven off and the resinous content brought into intimate relation with the filler to yield a homogeneous moldable composition.

2. Process of preparing a urea resin which comprises admixing a urea with an aldehyde under weakly basic conditions in the presence of a nitrogenous compound more basic than urea but not sufficiently basic to cause decomposition or resinification of the aldehyde and capable of reacting with the aldehyde in the proportion of at least two mols of the compound to not more than three mols of the aldehyde and subjecting the mixture to reaction conditions.

3. Process of preparing a urea resin which comprises admixing a urea with an aldehyde under weakly basic conditions in the presence of a nitrogenous compound selected from the group consisting of alkylamines and alkylene diamines capable of reacting with the aldehyde in the proportion of at least two mols of the compound to not more than three mols of the aldehyde, and subjecting the mixture to reaction conditions.

4. Process of preparing a urea resin which comprises admixing a urea with an aldehyde under weakly basic conditions in the presence of a nitrogenous compound more basic than urea but not sufficiently basic to cause decomposition or resinification of the aldehyde and capable of reacting with the aldehyde in the proportion of at least two mols of the compound to not more than three mols of the aldehyde, subjecting the mixture to reaction conditions and removing the nitrogenous compound upon completion of the resinification.

5. Process of preparing a urea resin which comprises admixing a urea with an aldehyde under weakly basic conditions in the presence of a nitrogenous compound more basic than urea but not sufficiently basic to cause decomposition or resinification of the aldehyde and capable of reacting with the aldehyde in the proportion of at least two mols of the compound to not more than three mols of the aldehyde, subjecting the mixture to reaction conditions and removing the nitrogenous compound upon completion of the resinification by the addition of a neutralizing agent forming a non-active addition product with the nitrogenous compound.

6. Process of preparing a urea resin which comprises admixing a urea with an aldehyde under weakly basic conditions in the presence of a nitrogenous compound selected from the group consisting of alkylamines and alkylene diamines capable of reacting with the aldehyde in the proportion of at least two mols of the compound to not more than three mols of the aldehyde, subjecting the mixture to reaction conditions and removing the nitrogenous compound upon completion of the resinification.

7. Process of preparing a urea resin which comprises admixing a urea with an aldehyde under weakly basic conditions in the presence of a nitrogenous compound selected from the group consisting of alkylamines and alkylene diamines capable of reacting with the aldehyde in the proportion of at least two mols of the compound to not more than three mols of the aldehyde, subjecting the mixture to reaction conditions and removing the nitrogenous compound upon completion of the resinification by the addition of a neutralizing agent forming a non-active addition product with the nitrogenous compound.

8. A heat reactive resinous condensation product of a urea and an aldehyde condensed under weakly basic conditions in the presence of a nitrogenous compound more basic than urea but not sufficiently basic to cause decomposition or resinification of the aldehyde and capable of reacting with the aldehyde in the proportion of at least two mols of the compound to not more than three mols of the aldehyde, characterized by having a high resistance to decomposition by heat.

9. A heat reactive resinous condensation product of a urea and an aldehyde condensed under weakly basic conditions in the presence of a nitrogenous compound selected from the group consisting of alkylamines and alkylene diamines capable of reacting with the aldehyde in the proportion of at least two mols of the compound to not more than three mols of the aldehyde, characterized by having a high resistance to decomposition by heat.

10. A heat reactive resinous condensation product of a urea and an aldehyde condensed under weakly basic conditions in the presence of from 1 to 5 grams to each gram-molecule of the urea of a nitrogenous compound more basic than urea but not sufficiently basic to cause decomposition or resinification of the aldehyde and capable of reacting with the aldehyde in the proportion of at least two mols of the compound to not more than three mols of the aldehyde, characterized by having a high resistance to decomposition by heat.

11. A heat reactive resinous composition product of a urea and an aldehyde condensed under weakly basic conditions in the presence of from 1 to 5 grams to each gram-molecule of the urea of a nitrogenous compound selected from the group consisting of alkylamines and alkylene diamines capable of reacting with the aldehyde in the proportion of at least two mols of the compound to not more than three mols of the aldehyde, characterized by having a high resistance to decomposition by heat.

HOWARD L. BENDER.
HARRY A. HOFFMAN.

---

CERTIFICATE OF CORRECTION.

Patent No. 2,084,314.   June 22, 1937.

HOWARD L. BENDER, ET AL.

It is hereby certified that error appears in the printed specification of the above numbered patent requiring correction as follows: Page 3, first column, line 22, for "farmaldehyde" read --formaldehyde--; same page, second column, line 42, for "30 parts" second occurrence, read --38 parts--; line 51, for "Example 2.—30 parts of urea, 38 parts of thio-" read --Example 3.—Since an aqueous solution of--; line 73, for "floc" read --flock--; and that the said Letters Patent should be read with this correction therein that the same may conform to the record of the case in the Patent Office.

Signed and sealed this 6th day of May, A. D. 1941.

Henry Van Arsdale,
Acting Commissioner of Patents.

(Seal)

neutralizing agent forming a non-active addition product with the nitrogenous compound.

8. A heat reactive resinous condensation product of a urea and an aldehyde condensed under weakly basic conditions in the presence of a nitrogenous compound more basic than urea but not sufficiently basic to cause decomposition or resinification of the aldehyde and capable of reacting with the aldehyde in the proportion of at least two mols of the compound to not more than three mols of the aldehyde, characterized by having a high resistance to decomposition by heat.

9. A heat reactive resinous condensation product of a urea and an aldehyde condensed under weakly basic conditions in the presence of a nitrogenous compound selected from the group consisting of alkylamines and alkylene diamines capable of reacting with the aldehyde in the proportion of at least two mols of the compound to not more than three mols of the aldehyde, characterized by having a high resistance to decomposition by heat.

10. A heat reactive resinous condensation product of a urea and an aldehyde condensed under weakly basic conditions in the presence of from 1 to 5 grams to each gram-molecule of the urea of a nitrogenous compound more basic than urea but not sufficiently basic to cause decomposition or resinification of the aldehyde and capable of reacting with the aldehyde in the proportion of at least two mols of the compound to not more than three mols of the aldehyde, characterized by having a high resistance to decomposition by heat.

11. A heat reactive resinous composition product of a urea and an aldehyde condensed under weakly basic conditions in the presence of from 1 to 5 grams to each gram-molecule of the urea of a nitrogenous compound selected from the group consisting of alkylamines and alkylene diamines capable of reacting with the aldehyde in the proportion of at least two mols of the compound to not more than three mols of the aldehyde, characterized by having a high resistance to decomposition by heat.

HOWARD L. BENDER.
HARRY A. HOFFMAN.

---

CERTIFICATE OF CORRECTION.

Patent No. 2,084,314.                                    June 22, 1937.

HOWARD L. BENDER, ET AL.

It is hereby certified that error appears in the printed specification of the above numbered patent requiring correction as follows: Page 3, first column, line 22, for "farmaldehyde" read --formaldehyde--; same page, second column, line 42, for "30 parts" second occurrence, read --38 parts--; line 51, for "Example 2.--30 parts of urea, 38 parts of thio-" read --Example 3.--Since an aqueous solution of--; line 73, for "floc" read --flock--; and that the said Letters Patent should be read with this correction therein that the same may conform to the record of the case in the Patent Office.

Signed and sealed this 6th day of May, A. D. 1941.

Henry Van Arsdale,
Acting Commissioner of Patents.

(Seal)

CERTIFICATE OF CORRECTION.

Patent No. 2,084,314.                                      June 22, 1937.

HOWARD L. BENDER, ET AL.

It is hereby certified that error appears in the printed specification of the above numbered patent requiring correction as follows: Page 3, first column, line 22, for "farmaldehyde" read --formaldehyde--; same page, second column, line 42, for "30 parts" second occurrence, read --38 parts--; line 51, for "Example 2.—30 parts of urea, 38 parts of thio-" read --Example 3.—Since an aqueous solution of--; line 73, for "floc" read --flock--; and that the said Letters Patent should be read with this correction therein that the same may conform to the record of the case in the Patent Office.

Signed and sealed this 6th day of May, A. D. 1941.

(Seal)                                                                          Henry Van Arsdale,
Acting Commissioner of Patents.